June 27, 1967  E. RIEGLER ET AL  3,327,549
TILTING DRIVE ARRANGEMENT FOR METALLURGICAL
FURNACES, SUCH AS CONVERTERS OR CRUCIBLES
Filed Nov. 30, 1964  2 Sheets-Sheet 1
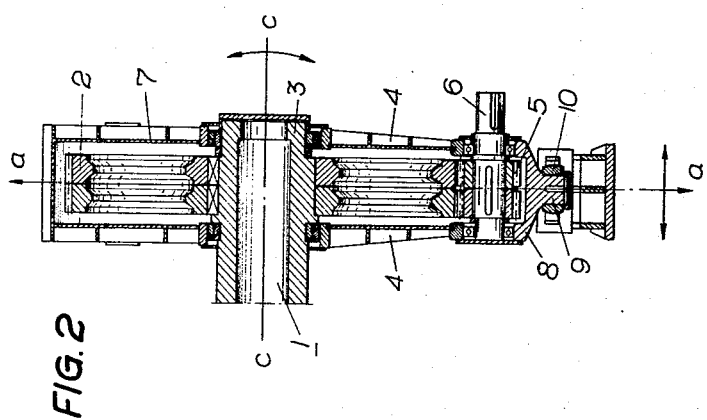
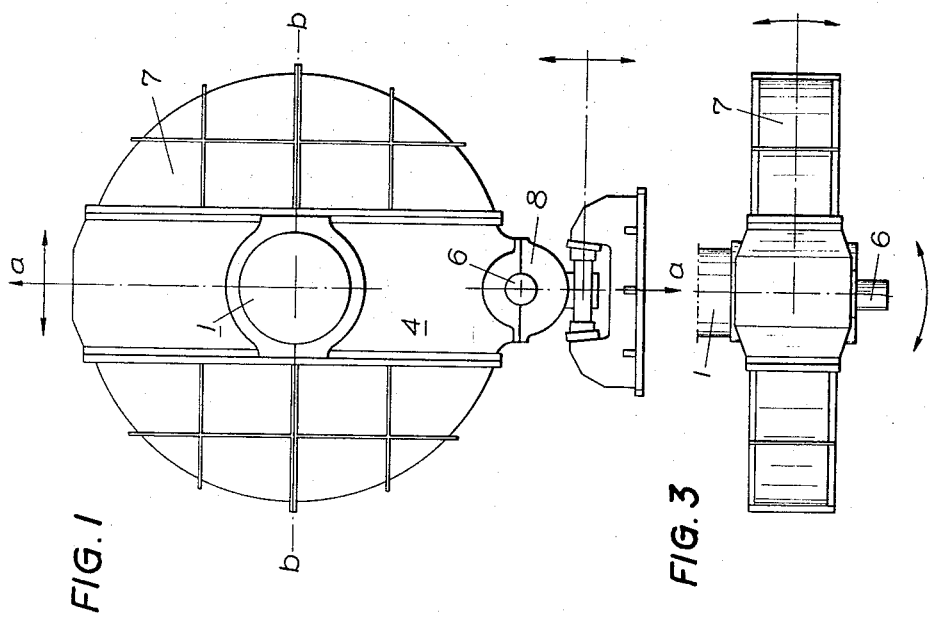
INVENTORS:
ERNST RIEGLER
HERMANN SCHUBERT
BY
THEIR ATTORNEYS June 27, 1967   E. RIEGLER ET AL   3,327,549
TILTING DRIVE ARRANGEMENT FOR METALLURGICAL
FURNACES, SUCH AS CONVERTERS OR CRUCIBLES
Filed Nov. 30, 1964                                   2 Sheets-Sheet 2
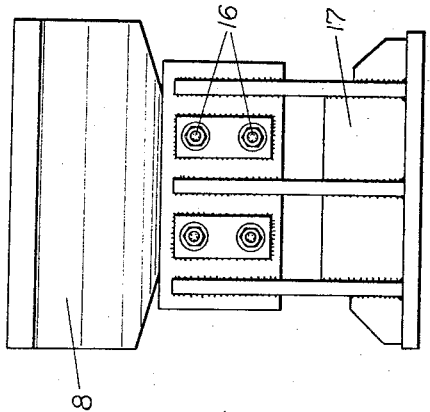
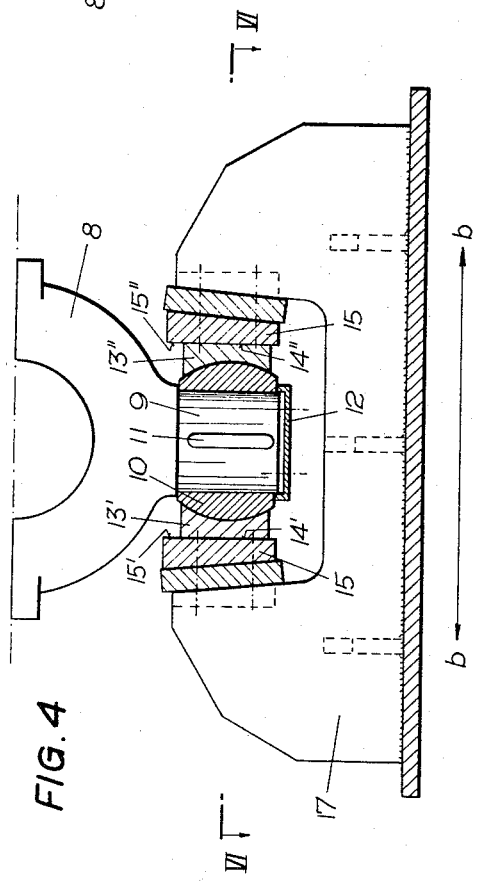
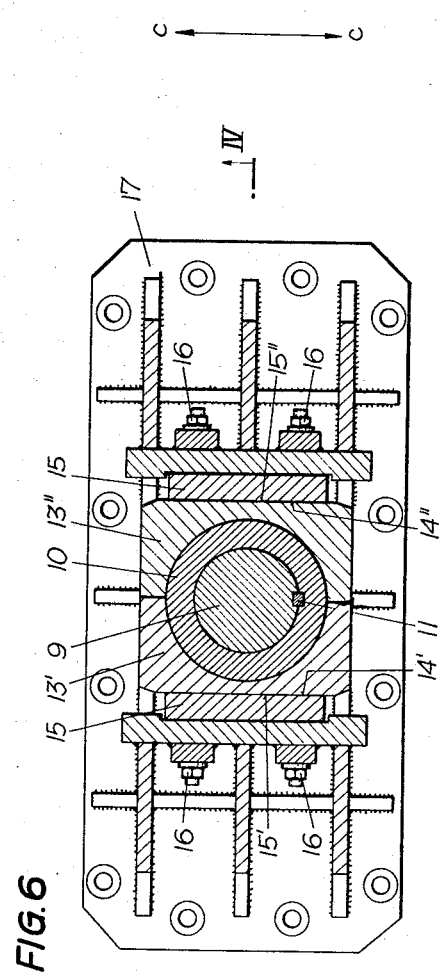
INVENTORS:
ERNST RIEGLER
HERMANN SCHUBERT
BY
THEIR ATTORNEYS

3,327,549
TILTING DRIVE ARRANGEMENT FOR METALLURGICAL FURNACES, SUCH AS CONVERTERS OR CRUCIBLES
Ernst Riegler, Enns, and Hermann Schubert, Linz, Austria, assignors to the firm Vereinigte Osterreichische Eisen- und Stahlwerke Aktiengesellschaft, Linz, Austria, a company of Austria
Filed Nov. 30, 1964, Ser. No. 414,827
Claims priority, application Austria, Dec. 6, 1963, A 9,815/63
5 Claims. (Cl. 74—410)

This invention relates to a tilting drive arrangement for metallurgical furnaces, such as converters or crucibles, which arrangement comprises a spur gear transmission, in which the pinion is mounted in a pinion carrier to oscillate about the output shaft.

In a construction of this type the entire housing for supporting the transmission is reduced to the pinion carrier, which can be machined satisfactorily and with high accuracy. The center distance of the gear from the pinion can be exactly maintained and is independent of the assembling work. During a displacement of the crucible trunnion in operation, a disturbing action of vibration on the toothed mesh is avoided because the entire transmission can follow the displacement.

Another advantage of this arrangement resides in that a smaller coupling can be used to connect the pinion carrier transmission to the succeeding transmission.

A torque take-up structure is required for a satisfactory function of the structure which has been described. This torque take-up structure must be capable of exactly guiding the pinion carrier transmission in the direction of the circumferential force i.e., in the direction of one transverse axis of the transmission and must provide for the maximum freedom of movement of the pinion carrier transmission in all directions, particularly in the longitudinal axis of the pinion carrier transmission and in the transverse axis which is normal to the direction of the circumferential force, in order to allow for the possible deformation of the trunnion due to thermal expansion or for movements of the trunnion due to vibration.

The present invention relates to an improved design of the support for the oscillatably mounted pinion carrier transmission in a tilting drive arrangement of the type defined above and resides in that the pinion carrier transmission is rotatable about the longitudinal axis of the transmission, displaceable along a slideway in the direction of one transverse axis of the transmission and fixed in the direction of the other transverse axis of the transmission.

The pinion shaft is suitably mounted in a housing, which has a pin, which extends in the longitudinal axis of the pinion carrier transmission, and a spherical bushing, which is rotatable in a spherical socket.

The spherical bushing may be secured to the pin by means of a spline and a disc.

In a preferred embodiment, the spherical socket, which may consist of two half-shells, is displaceable along a guideway extending in the direction of the one transverse axis of the transmission.

The slideway is preferably formed by two bearing plates, which are adjustable with respect to their spacing (in the direction of the transverse axis of the transmission) and have guide faces and are mounted on a pedestal, which is carried by the working platform, the spherical socket parts having slide faces conforming to the guide faces of the bearing plates.

The invention will be explained more fully in the drawing, which shows an embodiment by way of example; FIG. 1 is an end elevation, FIG. 2 a side elevation and FIG. 3 a top plan view showing the new pinion carrier transmission. FIGS. 4, 5 and 6 illustrate in detail the design of the torque take-up structure according to the invention, FIG. 4 being an end elevation, FIG. 5 a side elevation and FIG. 6 a top plan view. FIG. 4 corresponds also to a section taken on line IV—IV of FIG. 6, and FIG. 6 to a section taken on line VI—VI of FIG. 4.

According to FIGS. 1 and 2, a gear 2 is keyed to the output shaft 1 consisting of the trunion of a metallurgical refining vessel. The hub of the gear 3 is connected to a pinion carrier, which consists of two cheeks 4. The pinion carrier surrounds the hub or trunnion with a narrow journal bearing. At its other end, the pinion carrier carries the pinion 5, which is suspended for oscillation about the output shaft 1 and rolls on the pitch circle. The gear and pinion are enclosed in a lightweight sheet metal housing 7, which is screw-connected to the pinion carrier, so that the transmission is entirely enclosed and protected against an ingress of dirt.

The pinion shaft 6 of the pinion carrier transmission is mounted in a cast steel housing 8. This cast steel housing has a depending cylindrical pin 9, on which a spherical, quenched and tempered bushing 10 is fitted. This bushing is held against rotation by a spline 11; the spherical bushing is also located by means of an end disc 12 so that it cannot be pulled off the pin 9. The spherical bushing 10 is inserted in a spherical socket 13, which consists of two parts 13', 13" (FIG. 6). Slide faces 14', 14" extending in the direction of one transverse axis c—c (FIG. 6) of the transmission are formed on the parts 13', 13" of the spherical socket and co-operate with guide faces 15', 15" formed on the guide plates 15. The guide plates have a wedge-shaped cross-section (FIG. 4). As is apparent from the above description, the guide plates enclose between them the spherical bushing and the pin 9. By means of screws 16, the guide plates are secured to the pedestal 17, which is mounted on the working platform. The distance between the guide plates and with it the backlash in the direction of the second transverse axis b—b of the transmission is adjustable.

As is apparent from the above description of the subject matter of the invention, the movement of the pinion carrier transmission in the direction of one transverse axis b—b of the transmission is determined when the guide plates 15 have been set. In this direction, which is the direction of the circumferential force, the pinion carrier transmission is exactly guided so that a proper toothed mesh is ensured. In the direction c—c of that transverse axis of the pinion carrier transmission which is at right angles to the first-mentioned axis, there is one degree of freedom for a sliding movement of the spherical socket with its slide faces in contact with the guide faces of the bearing plates. A free movement is also ensured about the longitudinal axis a—a of the pinion carrier transmission because the spherical bushing is free to move in the spherical socket.

The design according to the invention enables thus a taking-up of displacements, vibrations and even of an eccentric movement of the trunnion of the crucible without enabling a disturbing effect on the toothed mesh so that the design is extremely reliable in operation. Its function requires only a minimum of attention and its life is a multiple of that of the known apparatus.

What we claim is:
1. A drive for a tilting metallurgical vessel comprising an output shaft, a gear fixed to said output shaft, a pinion carrier having an inner end mounted for rotation on said output shaft and an outer end spaced outwardly from said gear, an input shaft rotatably mounted in said outer end of said carrier, a pinion fixed to said input shaft and meshing with said gear, fixed guide means adjacent to said outer end of said pinion carrier and substantially parallel with said input shaft, and means rotatably mounted on said outer end of said pinion carrier and slidably engaging said fixed guide means for restraining said pinion carrier against rotation around said output shaft and enabling movement of said pinion carrier substantially in the direction of the axis of said input shaft and rotary movement about an axis extending perpendicular to and intersecting the axes of said output and input shafts.

2. The drive set forth in claim 1 in which said means rotatably connected to said outer end of said pinion carrier comprises a substantially spherical bushing attached to said pinion carrier and a spherical socket receiving said bushing and slidably engaging said guide means.

3. A tilting drive arrangement for metallurgical vessels comprising an output shaft, a gear on said output shaft, a pinion carrier having an inner end and an outer end mounted for oscillation about the output shaft, a pinion rotatably mounted adjacent the outer end of said pinion carrier and meshing with said gear, a pin extending from the outer end of said pinion carrier and substantially radially of said output shaft, a substantially spherical bushing on said pin, a slide member having a spherical socket receiving said bushing and outer opposite slide surfaces, a fixed base, a slideway mounted on said base and including two bearing plates slidably engaging said guide surfaces and opposing oscillating movement of said pinion carrier around the axis of said output shaft and means for adjusting the spacing between said bearing plates, said spherical bushing and socket and said bearing plates enabling movement of said pinion carrier about the axis of said pin and displacement of said pinion carrier in directions lengthwise of the axis of said pinion.

4. A tilting drive arrangement as set forth in claim 3, wherein said bearing plates have a wedge-shaped cross section.

5. A tilting drive arrangement at set forth in claim 3, wherein said spherical socket consists of two half-shells.

References Cited

UNITED STATES PATENTS

| | | | |
|---|---|---|---|
| 1,502,199 | 7/1924 | Hodgkinson | 74—410 |
| 1,591,826 | 7/1926 | Hodgkinson | 74—410 |
| 2,541,080 | 2/1951 | Lyon | 308—59 X |

FRED C. MATTERN, Jr., *Primary Examiner.*

DAVID J. WILLIAMOWSKY, *Examiner.*

C. J. HUSAR, *Assistant Examiner.*